US009846325B2

(12) United States Patent
Yu et al.

(10) Patent No.: US 9,846,325 B2
(45) Date of Patent: Dec. 19, 2017

(54) ARRAY SUBSTRATE, TOUCH DISPLAY PANEL AND TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Quanpeng Yu, Shanghai (CN); Yong Yuan, Shanghai (CN); Danping Wei, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 182 days.

(21) Appl. No.: 14/927,389

(22) Filed: Oct. 29, 2015

(65) Prior Publication Data

US 2016/0327834 A1 Nov. 10, 2016

(30) Foreign Application Priority Data

May 8, 2015 (CN) .......................... 2015 1 0232915

(51) Int. Cl.
   *G02F 1/1333*   (2006.01)
   *G06F 3/041*    (2006.01)
   *G02F 1/1343*   (2006.01)
   *G06F 3/044*    (2006.01)

(52) U.S. Cl.
   CPC .... *G02F 1/13338* (2013.01); *G02F 1/134363* (2013.01); *G06F 3/0412* (2013.01); *G02F 2001/134318* (2013.01); *G06F 3/044* (2013.01)

(58) Field of Classification Search
   CPC ............ G02F 1/1333; G02F 1/134309; G02F 1/13338; G02F 1/133514; G02F 2001/134318; G06F 3/047; G06F 3/044; G06F 3/0412
   See application file for complete search history.

(56) References Cited

U.S. PATENT DOCUMENTS 9,151,790 B1 * 10/2015 Hoshtanar .......... G01R 27/2605
9,207,819 B2 * 12/2015 Tsai .......................... G06F 3/044
9,618,782 B2 *  4/2017 Yao ..................... G02F 1/13338
(Continued)

*Primary Examiner* — Timothy L Rude
(74) *Attorney, Agent, or Firm* — Faegre Baker Daniels LLP

(57) ABSTRACT

An array substrate, a touch display panel and a touch display device. The array substrate includes: a substrate; a pixel electrode layer; a common electrode layer, which comprises a plurality of common electrode blocks, wherein the common electrode blocks are operable as touch electrodes; a wiring layer, comprises a plurality of wirings, wherein each of the wirings is electrically connected with a corresponding one of the common electrode blocks, and at least one wiring is each overlapped with at least one common electrode block electrically insulated therefrom; and first bridge structures and auxiliary electrodes disposed in the pixel electrode layer, wherein each first bridge structure is configured for a connection between the wiring and the common electrode block, and each auxiliary electrode is connected with one of the wirings and disposed above the common electrode block insulated from and overlapped with the wiring.

15 Claims, 7 Drawing Sheets

(56) References Cited

U.S. PATENT DOCUMENTS

| | | | |
|---|---|---|---|
| 2014/0055412 A1* | 2/2014 | Teramoto | G06F 3/0412 345/174 |
| 2014/0240279 A1* | 8/2014 | Hwang | G06F 3/0412 345/174 |
| 2015/0268781 A1* | 9/2015 | Ishizaki | G06F 3/0412 345/174 |
| 2016/0062164 A1* | 3/2016 | Chae | G02F 1/13338 349/12 |
| 2016/0124557 A1* | 5/2016 | Choi | G06F 3/0412 345/173 |
| 2016/0299631 A1* | 10/2016 | Lee | G06F 3/044 |
| 2016/0334660 A1* | 11/2016 | Lin | G02F 1/13338 |
| 2016/0343328 A1* | 11/2016 | Li | G09G 3/3688 |
| 2017/0147107 A1* | 5/2017 | Ishizaki | G06F 3/0412 |
| 2017/0212629 A1* | 7/2017 | Cho | G06F 3/044 |
| 2017/0262108 A1* | 9/2017 | Lin | G02F 1/13338 |

\* cited by examiner

ARRAY SUBSTRATE, TOUCH DISPLAY PANEL AND TOUCH DISPLAY DEVICE

CROSS-REFERENCE TO RELATED APPLICATION

This application claims priority to Chinese Application No. 201510232915.X, filed May 8, 2015, which is herein incorporated by reference in its entirety.

TECHNICAL FIELD

The present disclosure relates to touch display technologies and, in particular, to an array substrate, a touch display panel and a touch display device.

BACKGROUND

With rapid development of display technologies, touch display panels have been increasingly popular among users. Depending on their structures, the existing touch display panels include add-on type touch display panels, on-cell touch display panels and in-cell touch display panels. In the in-cell touch display panel, touch electrodes for a touch sensing function are embedded in the liquid crystal display panel to reduce the overall thickness of the touch display panel and also significantly decrease manufacturing costs of the touch display panel, thus the in-cell touch display panels are favored by touch display panel manufacturers.

In the existing in-cell touch display panel, an array substrate includes a common electrode layer which is generally divided into a plurality of common electrode blocks, which may be reused (or driven, or operable) as touch electrodes, and each of the common electrode blocks is electrically connected with a drive chip by a metal wiring electrically insulated from other common electrode blocks. In particular, the metal wiring is electrically connected with the corresponding common electrode block by a bridge structure. Since the bridge structure is disposed in the same layer as the pixel electrode, and is maintained at an electric potential that is the same as that of the corresponding common electrode block because the bridge structure is electrically connected with the common electrode block, an additional electric field formed between the pixel electrode and the bridge structure is added to an existing electric field formed between the common electrode block and the pixel electrode, thereby causing differences of electric field distribution between a region with the bridge structure and a region without the bridge structure above the metal wiring, and hence causing differences of brightness between the region with the bridge structure and the region without the bridge structure in the display panel, so that the overall display brightness of the display panel is non-uniform.

SUMMARY

The present disclosure provides an array substrate, a touch display panel and a touch display device to eliminate the non-uniform display brightness.

In a first example, embodiments of the disclosure provide an array panel, including:
a substrate;
a pixel electrode layer, which is disposed on the substrate and comprises a plurality of pixel electrodes spaced from each other and arranged in an array;
a common electrode layer, which is disposed at a side of the pixel electrode layer close to the substrate and comprises a plurality of common electrode blocks spaced from each other and arranged in an array, wherein the common electrode blocks are operable as touch electrodes;
a wiring layer, which is disposed at a layer different from the pixel electrode layer and comprises a plurality of wirings, wherein each of the wirings is electrically connected with a corresponding one of the common electrode blocks but is electrically insulated from other common electrode blocks, and at least one wiring is each overlapped with at least one common electrode block electrically insulated therefrom; and
first bridge structures and auxiliary electrodes disposed in the pixel electrode layer, wherein each first bridge structure is disposed at and configured for a connection between the wiring and the common electrode block corresponding to the wiring, and each auxiliary electrode is connected with one of the wirings and disposed above the common electrode block insulated from and overlapped with the wiring.

In a second example, embodiments of the disclosure further provide a touch display panel, including:
the array substrate described in embodiments above;
a color filter substrate disposed opposite to the array substrate, and
a liquid crystal layer disposed between the array substrate and the color filter substrate.

In a third example, embodiments of the disclosure further provide a touch display device, including: the touch display panel described in embodiments above and a drive chip configured for driving the touch display panel in a display phase and a touch sensing phase.

With the array substrate, the touch display panel and the touch display device described in the disclosure, the auxiliary electrode which is connected with the wiring is disposed above the common electrode block insulated from and overlapped with the wiring, so that the electric potential at the auxiliary electrode and the electric potential at the first bridge structure are the same, and further the electric field at the region with the first bridge structure and the electric field at the region without the first bridge structure are the same, to avoid non-uniform brightness of the display panel.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
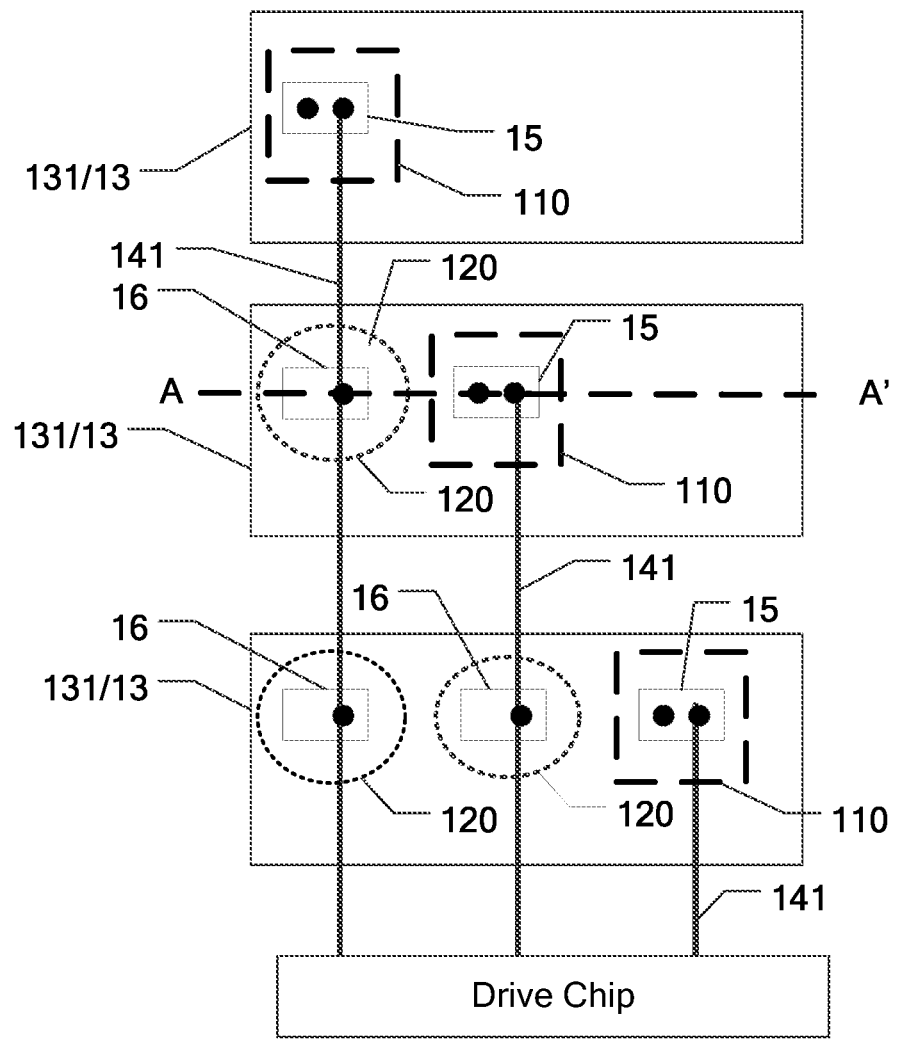
FIG. 1 is a partial top view of an array substrate, according to embodiments of the disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In order to make the objects, technical solutions and advantages of the disclosure more clear, the technical solutions of the disclosure are clearly and completely described below with reference to the drawings in combination with the embodiments of the disclosure. Obviously, merely some instead of all embodiments of the disclosure are described herein. In light of the described embodiments of the disclosure, all other embodiments obtained by those skilled in the art fall within the protection scope of the disclosure.

Figure 2:
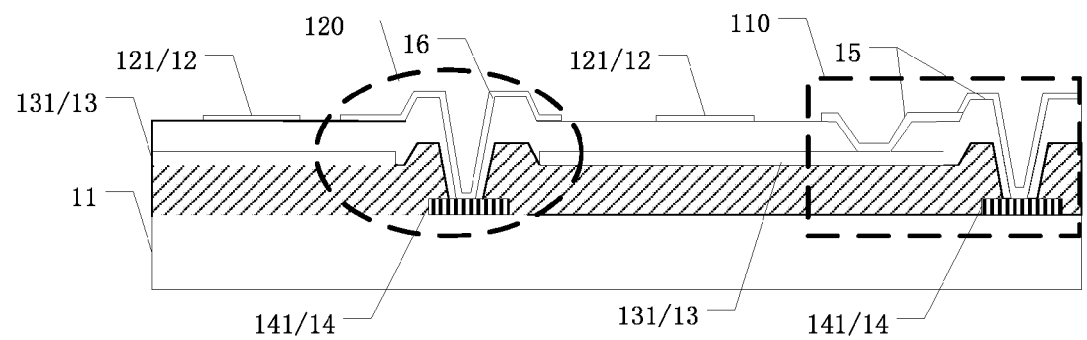
FIG. 2 is a partial cross-sectional view of the array substrate of FIG. 1 taken along a line AA' in FIG. 1.
Figure 3:
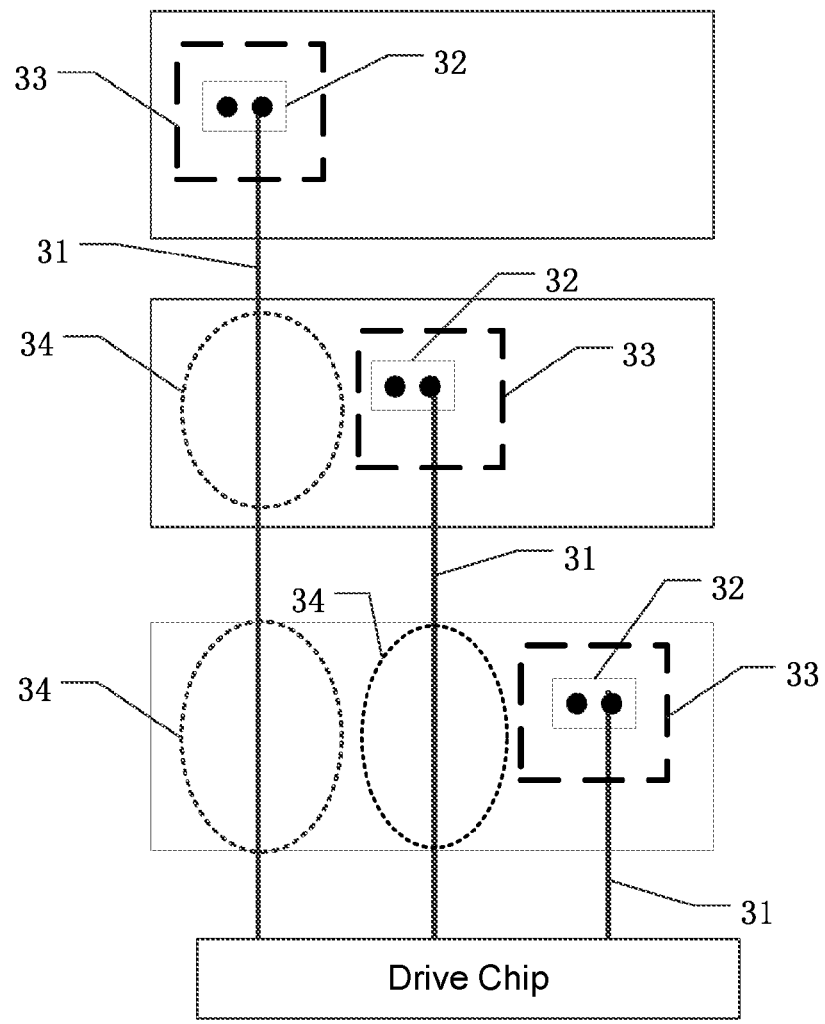
FIG. 3 is a partial top view of an array substrate of an in-cell touch display panel in the related art.

Embodiments of the disclosure provide an array substrate. FIG. 1 is a partial top view of an array substrate, according to embodiments of the disclosure. As shown in FIG. 1, a common electrode layer 13 of the array substrate includes a plurality of common electrode blocks 131 spaced from each other and arranged in an array, and the common electrode blocks 131 are operable as a common electrode in a display phase and are operable as touch electrodes in a touch sensing phase; each common electrode block 131 is electrically connected with one (conductive) wiring 141 corresponding to the common electrode block 131, and at least one wiring 141 is each overlapped with at least one common electrode block 131 electrically insulated from the wiring 141. Preferably, the wiring 141 is extended along a column of the common electrode blocks 131, and overlapped with at least a portion of common electrode blocks 131 in the column of common electrode blocks 131. Referring to FIG. 1, the wiring 141 is extended from the common electrode block 131 connected with the wiring 141 to the drive chip along the column of common electrode blocks 131, and is overlapped with the common electrode blocks 131 electrically insulated from the wiring 141. Specifically, each wiring 141 is electrically connected with the common electrode block 131 corresponding to the wiring 141 by a first bridge structure 15, and is connected with auxiliary electrodes 16 at intersections between the wiring 141 and other common electrode blocks 131 insulated from and overlapped with the wiring 141. FIG. 2 is a partial cross-sectional view of the array substrate of FIG. 1 taken along a line AA' in FIG. 1. As shown in FIG. 2, the array substrate includes: a substrate 11; a pixel electrode layer 12 above the substrate 11, which includes a plurality of pixel electrodes 121 spaced from each other and arranged in an array; a common electrode layer 13 disposed at a side of the pixel electrode layer 12 close to the substrate 11, where the common electrode layer 13 includes a plurality of common electrode blocks 131 spaced from each other and arranged in an array, and the common electrode blocks 131 are operable as touch electrodes; a wiring layer 14 disposed in a layer different from the pixel electrode layer 12, where the wiring layer 14 is located at a side of the common electrode layer 13 close to the substrate 11, the wiring layer 14 includes a plurality of wirings 141, each wiring 141 is electrically connected with one corresponding common electrode block and is electrically insulated from the remaining common electrode blocks, and at least one wiring 141 is each overlapped with at least one common electrode block 131 electrically insulated therefrom; and first bridge structures 15 and auxiliary electrodes 16 disposed in the pixel electrode layer 12, where each first bridge structure 15 is disposed at and configured for a connection between one of the wirings 141 and the common electrode block 131 corresponding to the wiring 141, and each auxiliary electrode 16 connected with one of the wirings 141 is disposed above a common electrode block 131 insulated from and overlapped with the one wiring 141. Since the auxiliary electrode 16 is also connected with the wiring 141 and the wiring 141 is further connected with the common electrode 131 by the first bridge structure 15, the electric potential at the auxiliary electrode 16 is the same as that at the first bridge structure 15. FIG. 3 is a partial top view of an array substrate of an in-cell touch display panel in the related art. Referring to FIG. 3, electric field distribution at a region 33 with the bridge structure 32 above a metal wiring 31 is different from electric field distribution at a region 34 without the bridge structure 32 above the metal wiring 31, thereby causing differences of brightness between the region 33 with the bridge structure 32 and the region 34 without the bridge structure 32 in the display panel. In comparison with the array substrate in FIG. 3, electric field distribution at a region 110 with the first bridge structure 15 and a region 120 with the auxiliary electrode 16 in the array substrate shown in FIG. 1, according to embodiments of the disclosure, are the same, so that display brightness at the regions 110 and 120 is identical under the same electric field distribution, thereby avoiding the non-uniform display brightness of the display panel.

In embodiments of the disclosure, the first bridge structure and the auxiliary electrode are provided in the pixel electrode layer, where the first bridge structure is disposed at and configured for a connection between the wiring and the common electrode block corresponding to the wiring, and the auxiliary electrode which is connected with the wiring is disposed above the common electrode block insulated from and overlapped with the wiring, so that the electric field at the region with the first bridge structure and the electric field at the region without the first bridge structure are the same, to avoid non-uniform brightness of the display panel.

In other embodiments, the structure of the array substrate can be implemented in various manners. For example, the wiring layer is located at a side of the common electrode layer close to the substrate, or the wiring layer is located between the common electrode layer and the pixel electrode layer, or the wiring layer is provided at the same as the common electrode layer; again for example, each wiring is overlapped with all common electrode blocks in a column of common electrode blocks, and a sum of a first bridge structure and auxiliary electrodes both connected with each common electrode block is identical, as long as the first bridge structures and the auxiliary electrodes are disposed at the same layer as the pixel electrode layer, each first bridge structure is disposed at and configured for a connection between one of the wirings and the common electrode block corresponding to the wiring, and each auxiliary electrode is connected with one of the wirings and disposed above the common electrode block insulated from and overlapped with the wiring, to avoid the non-uniform display brightness of the display panel. Embodiments will be described below.

Figure 4:
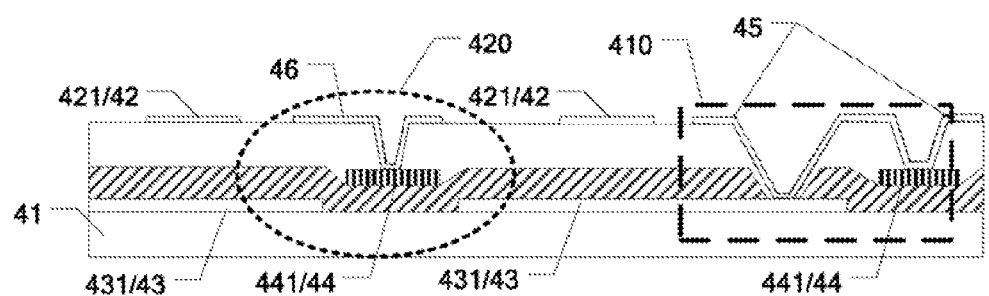
FIG. 4 is a partial cross-sectional view of an array substrate, according to embodiments of the disclosure.

FIG. 4 is a partial cross-sectional view of an array substrate, according to embodiments of the disclosure. As shown in FIG. 4, the array substrate includes: a substrate 41; a pixel electrode layer 42, which is disposed above the substrate 41 and includes a plurality of pixel electrodes 421 spaced from each other and arranged in an array; a common electrode layer 43, which is disposed at a side of the pixel electrode layer 42 close to the substrate 41 and includes a plurality of common electrode blocks 431 spaced from each other and arranged in an array, where the common electrode blocks 431 are operable as touch electrodes; a wiring layer 44 disposed at a layer different from the pixel electrode layer 42, and more particularly located between the common electrode layer 43 and the pixel electrode layer 42, where the wiring layer 44 includes a plurality of wirings 441, at least one of the wirings 441 is each electrically connected with a corresponding common electrode block and electrically insulated from other common electrode blocks, and each wiring is overlapped with at least one common electrode block electrically insulated from the wiring; and first bridge structures 45 and auxiliary electrodes 46 disposed in the pixel electrode layer 42, where each first bridge structure 45 is disposed at and configured for a connection between one of the wirings 441 and the common electrode block 431 corresponding to the wiring 441, and each auxiliary electrode 46 is connected with one of the wirings 441 and disposed above the common electrode block 431 insulated from and overlapped with the wiring 441. Since the auxiliary electrode 46 is connected with the wiring 441 in the array substrate, the electric potential at the auxiliary electrode 46 is identical to the electric potential at the first bridge structure 45, and thus electric field distribution at a region 410 with the first bridge structure is identical to the electric field distribution at a region 420 with the auxiliary electrode. Therefore, in the case that the wiring layer is disposed between the common electrode layer and the pixel electrode layer, according to embodiments of the disclosure, the technical effect of uniform display brightness of the display panel can also be achieved.

Figure 5:
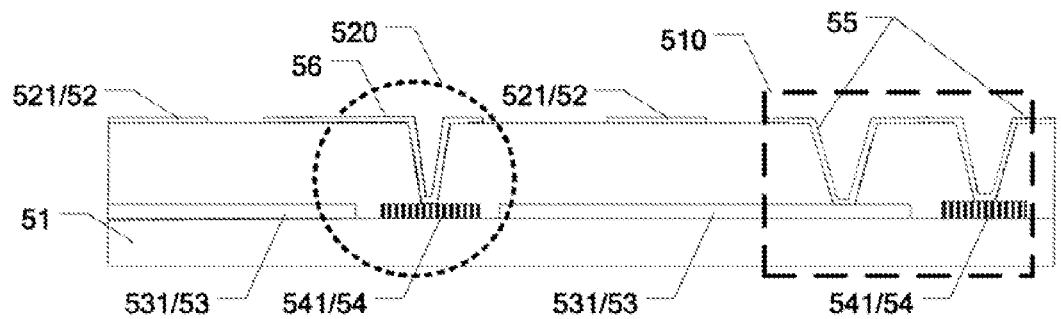
FIG. 5 is a partial cross-sectional view of an array substrate, according to embodiments of the disclosure.

FIG. 5 is a partial cross-sectional view of an array substrate, according to embodiments of the disclosure. As shown in FIG. 5, the array substrate includes: a substrate 51; a pixel electrode layer 52, which is disposed above the substrate 51 and includes a plurality of pixel electrodes 521 spaced from each other and arranged in an array; a common electrode layer 53, which is disposed at a side of the pixel electrode layer 52 close to the substrate 51 and includes a plurality of common electrode blocks 531 spaced from each other and arranged in an array, where the common electrode blocks 531 are operable as touch electrodes; a wiring layer 54 disposed at a layer different from the pixel electrode layer 52 and disposed at the same layer as the common electrode layer 53, where the wiring layer 54 includes a plurality of wirings 541, and each wiring 541 is electrically connected with one corresponding common electrode block 531 and electrically insulated from other common electrode blocks 531, and at least one wiring 541 is each overlapped with at least one common electrode block 531 electrically insulated therefrom; and first bridge structures 55 and auxiliary electrodes 56 disposed in the pixel electrode layer 52, where each first bridge structure 55 is disposed at and configured for a connection between one of the wirings 541 and the common electrode block 531 corresponding to the wiring 541, and each auxiliary electrode 56 is connected with one of the wirings 541 and disposed above the common electrode block 531 insulated from and overlapped with the wiring 541. Since the auxiliary electrode 56 is connected with the wiring 541 in the array substrate, the electric potential at the auxiliary electrode 56 is identical to the electric potential at the first bridge structure 55, and thus electric field distribution at a region 510 with the first bridge structure is identical to the electric field distribution at a region 520 with the auxiliary electrode. Therefore, in the case that the wiring layer is disposed at the same layer as the common electrode layer, according to embodiments of the disclosure, the technical effect of uniform display brightness of the display panel can also be achieved.

In some embodiments, the first bridge structures, the auxiliary electrodes and the pixel electrodes described in the above embodiments can be made of the same material in the same process, which is advantageous in that only one etching process is performed in manufacturing the first bridge structures, the auxiliary electrodes and the pixel electrodes, without the need for different masks respectively for the first bridge structures, the auxiliary electrodes and the pixel electrodes, thereby saving costs, reducing manufacture processes and improving production efficiency.

Figure 6:
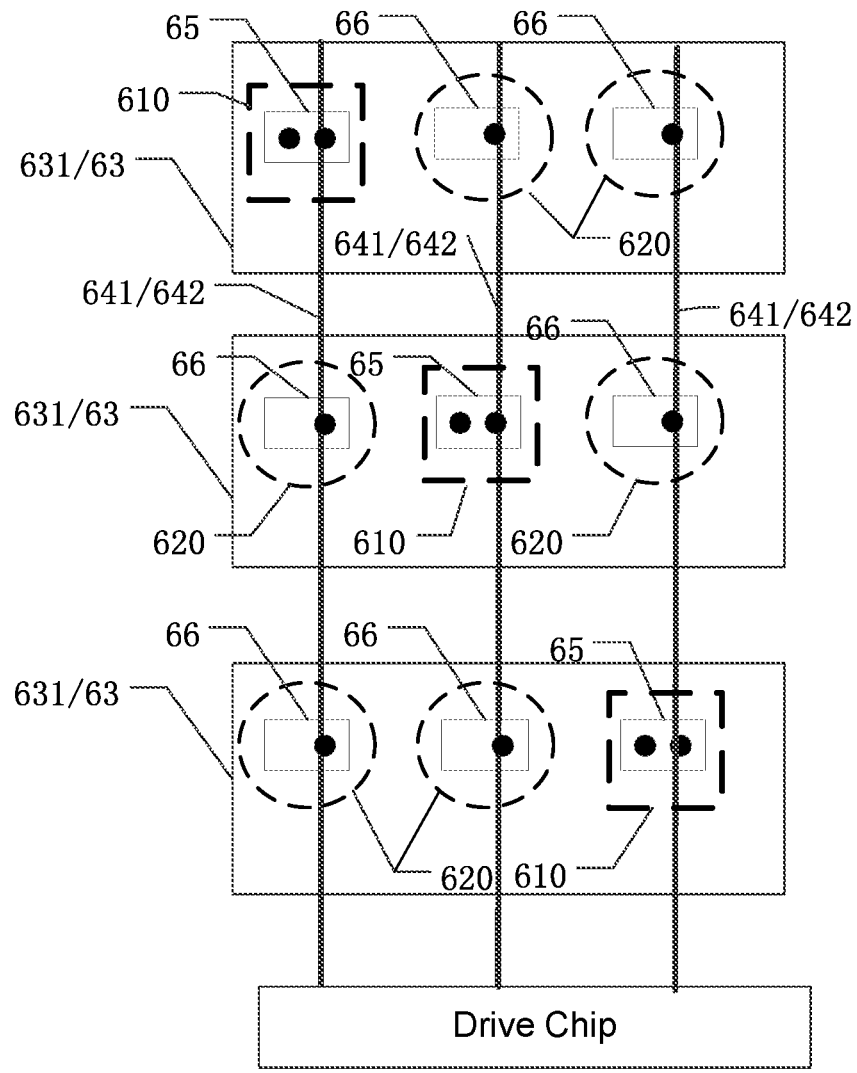
FIG. 6 is a partial top view of an array substrate, according to embodiments of the disclosure.

As such, with the arrangement of the wirings in the array substrate, according to embodiments of the disclosure, each wiring is electrically connected with one corresponding common electrode block and electrically insulated from other common electrode blocks, and each wiring is overlapped with at least one common electrode block electrically insulated from the wiring. Optionally, each wiring is overlapped with all common electrode blocks disposed along the extending direction of the wiring. FIG. 6 is a partial top view of an array substrate, according to embodiments of the disclosure. As shown in FIG. 6, a common electrode layer 63 of the array substrate includes a plurality of common electrode blocks 631 which are spaced from each other, arranged in an array and operable as touch electrodes; each common electrode block 631 is electrically connected with one wiring 641 corresponding to the common electrode block 631; and each wiring 641 is overlapped with all common electrode blocks 631 in a column of common electrode blocks. Each wiring 641 is electrically connected with the corresponding common electrode block 631 by the first bridge structure 65 and is connected with auxiliary electrodes 66 at intersections between the wiring 641 and other common electrode blocks 631 insulated from and overlapped with the wiring 641. As such, each wiring is overlapped with all common electrode blocks disposed along the extending direction of the wiring, is connected with the corresponding one of the common electrode blocks 631 by the first bridge structure 65, and is connected with the auxiliary electrode 66 at an intersection between the wiring and any remaining common electrode block 631 which is insulatedly overlapped with the wiring, thus the auxiliary electrode is provided at a region 620 above the common electrode block 631 aligning with a region 60 provided with the first bridge structure 65 in the entire array substrate, which can ensure the uniform distribution of the wirings in the entire array substrate, thereby improving brightness consistency of the display panel and image displaying quality.

Figure 7:
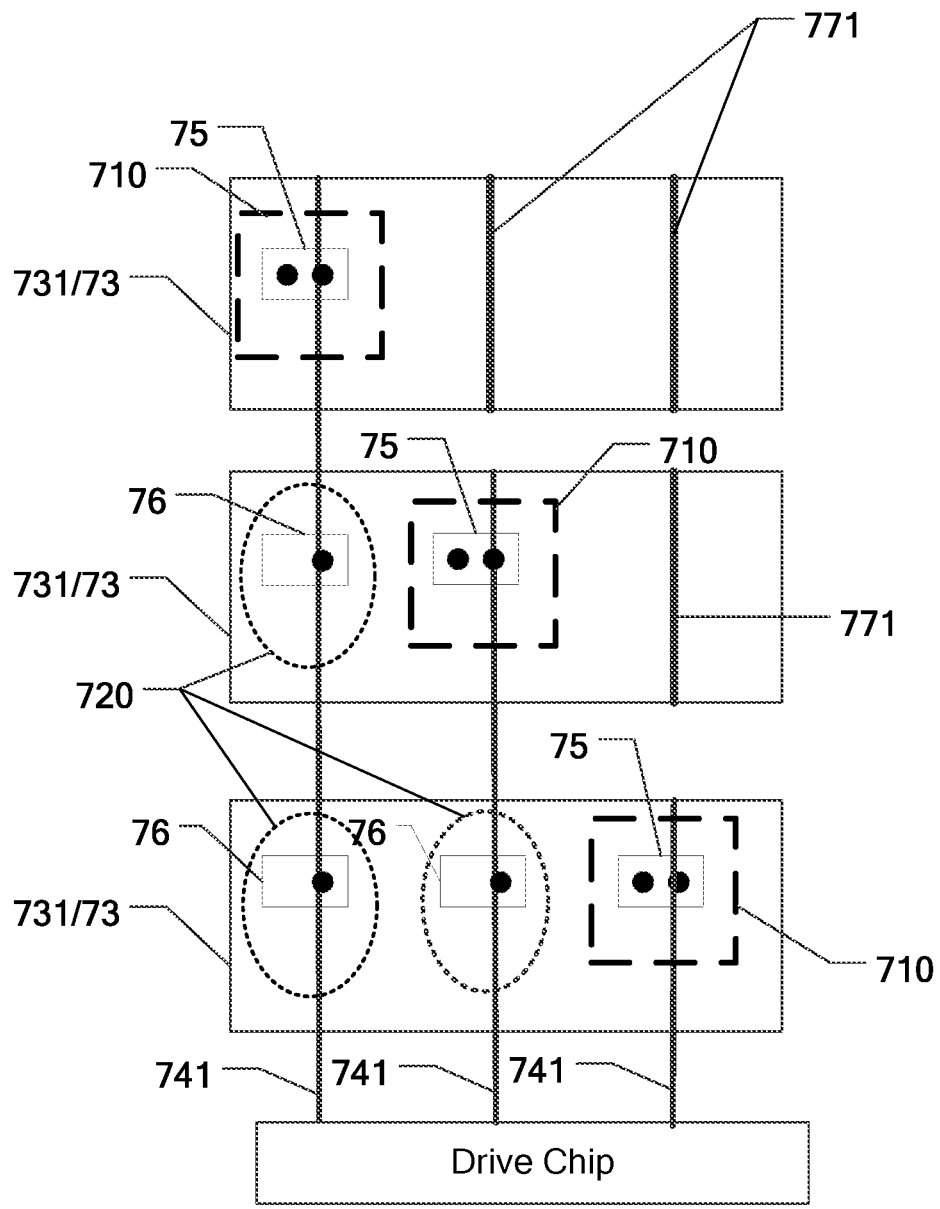
FIG. 7 is a partial view of an array substrate, according to embodiments of the disclosure.

FIG. 7 is a partial view of an array substrate, according to embodiments of the disclosure. As shown in FIG. 7, a common electrode layer 73 of the array substrate includes a plurality of common electrode blocks 731 spaced from each other and arranged in an array. The common electrode blocks 731 are operable as touch electrodes, and each common electrode block 731 is electrically connected with one wiring 741 corresponding to the common electrode block. Each wiring 741 is electrically connected with the corresponding common electrode block 731 via a first bridge structure 75 and is connected with auxiliary electrodes 76 at intersections between the wiring 741 and other common electrode blocks 731 insulatedly overlapped with the wiring. Additionally, a dummy conductive wiring segment 771 is disposed on the same line as the wiring 741 and is located in a region of a common electrode block 731 insulated from but not overlapped with the wiring 741. As such, in the array substrate, the electric potential at the auxiliary electrode 76 is identical to the electric potential at the first bridge structure 75, thus electric field distribution at a region 710 with the first bridge structure 76 is identical to electric field distribution at a region 720 with the auxiliary electrode 76, thereby avoiding the non-uniform display brightness of the display panel. Further, since the dummy conductive wiring segment 771 is present within a region of the common electrode block 731 insulated from but not overlapped with the wiring 741, the wirings are evenly distributed across the entire array substrate to improve image displaying quality of the display panel.

Figure 8:
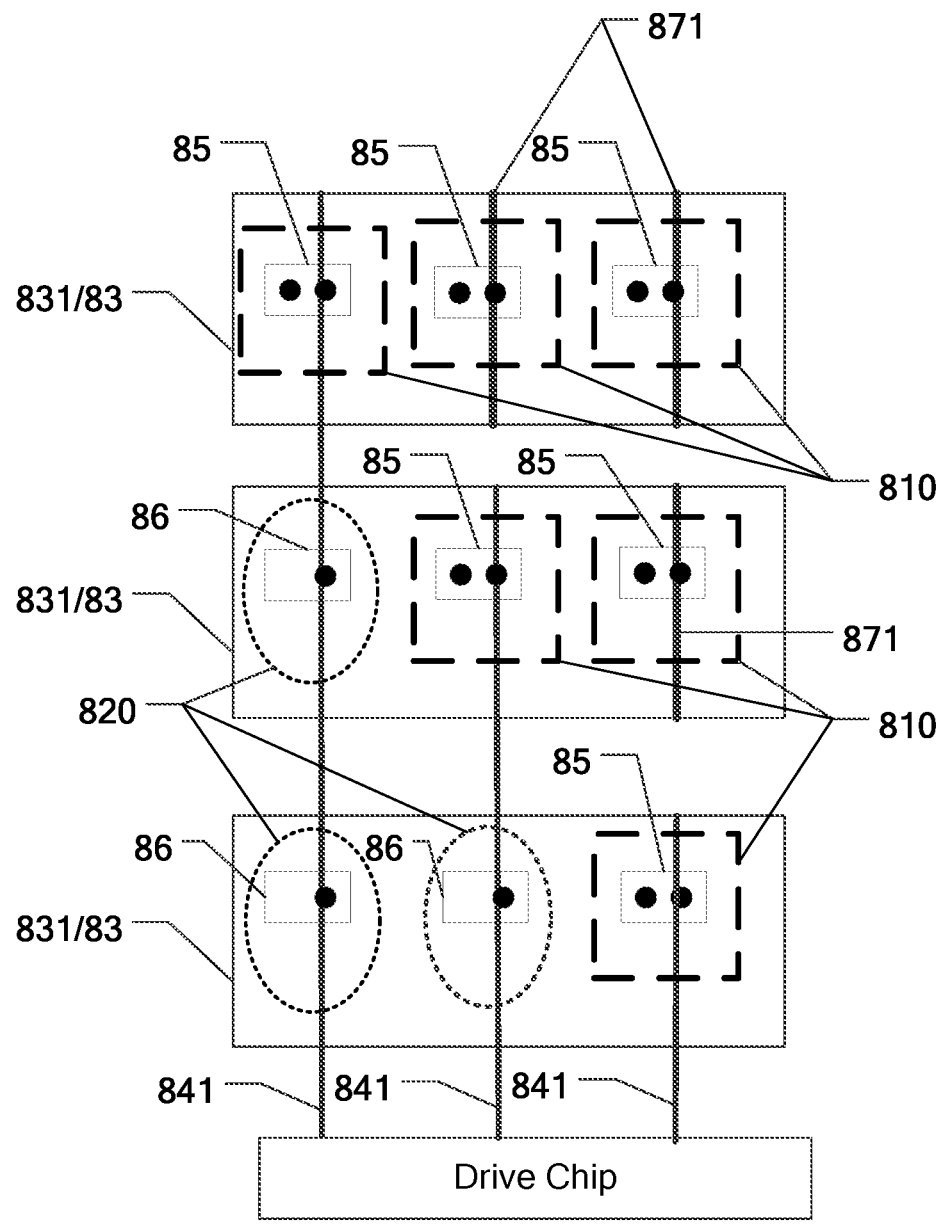
FIG. 8 is a partial view of an array substrate, according to embodiments of the disclosure.

On the basis of the preceding embodiments, FIG. 8 is a partial view of a further array substrate, according to embodiments of the disclosure. As shown in FIG. 8, a common electrode layer 83 of the array substrate includes a plurality of common electrode blocks 831 spaced from each other and arranged in an array. The common electrode blocks 831 are operable as touch electrodes, and each common electrode block 831 is electrically connected with one wiring 841 corresponding to the common electrode block 831. Each wiring 841 is electrically connected with the corresponding common electrode block 831 via a first bridge structure 85 and is connected with auxiliary electrodes 86 at intersections between the wiring 841 and other common electrode blocks 831 insulatedly overlapped the wiring 841. Additionally, a dummy conductive wiring segment 871 is disposed on the same line as the wiring 841 and is located in a region of a common electrode block 831 insulated from but not overlapped with the wiring 841. The dummy conductive wiring segment 871 is located at the same layer as the wiring 841, and is connected with the corresponding common electrode block 831 via a first bridge structure 85. As such, in the array substrate, each wiring 841 is not overlapped with all common electrode blocks 8331 in one column of common electrode blocks 8331, however, the dummy conductive wiring segment 871 is present in a region of the common electrode block 831 insulated from but not overlapped with the wiring 841, is located at the same line as the wiring 841, and is electrically connected with the corresponding common electrode block 831 via the first bridge structure 85, thus the electric potential at the first bridge structure 85 connected with the dummy conductive wiring segment 871 is the same as the electric potential at the first bridge structure 85 connected with the wiring 841, and hence electric field distribution at a region 810 with the first bridge structure is identical to electric field distribution at a region 820 with the auxiliary electrode in FIG. 8, thereby the brightness is uniform across the entire array substrate.

It is noted that, in the array substrate, according to embodiments of the disclosure, each common electrode block is electrically connected with a plurality of wirings to prevent a touch failure caused by the breaking of a single wiring connected thereto, herein, embodiments of the disclosure make no limitation to the number of the wirings corresponding to each common electrode block. Alternatively, each wiring can further be connected with the corresponding common electrode block by a plurality of first bridge structures, and be connected with a plurality of auxiliary electrodes at an intersection between the wiring and each other common electrode block insulated from the wiring, to prevent the touch failure due to poor contact by a single first bridge structure, and further reduce the resistance of the common electrode block. Embodiments of the disclosure makes no limitation to the number of the first bridge structures and the auxiliary electrodes, as long as the sum of the number of the first bridge structures and the auxiliary electrodes both connected with each common electrode block is identical, so that the brightness of the display panel can keep uniform.

On the basis of the embodiments described above, the array substrate further includes a plurality of data lines and a plurality of scanning lines, the wirings are parallel to either the data lines or the scanning lines in the array substrate, and an orthographic projection of the wiring onto the array substrate is within an orthographic projection of either the data line or the scanning line onto the array substrate, so that the various wirings will not affect the aperture ratio of pixel units. For example, in FIG. 6, the metal wirings 641 are parallel to either the data lines or the scanning lines 642 in the array substrate, and an orthographic projection of the metal wiring 641 onto the array substrate is within an orthographic projection of either the data line or the scanning line 642 onto the array substrate.

Figure 9:
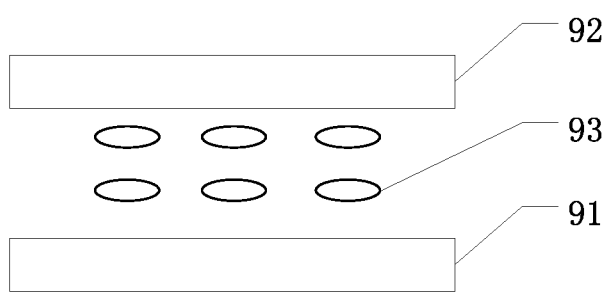
FIG. 9 is a schematic diagram showing a structure of a touch display panel, according to embodiments of the disclosure.

Embodiments of the disclosure further provide a touch display panel. FIG. 9 is a schematic diagram showing a structure of a touch display panel, according to embodiments of the disclosure. As shown in FIG. 9, the touch display panel includes: an array substrate 91, a color filter substrate 92 disposed opposite to the array substrate 91 and a liquid crystal layer 93 disposed between the array substrate 91 and the color filter substrate 92. The array substrate 91 may be one provided in any of the embodiments described above. As such, the touch display panel utilizes the array substrate in any of the embodiments described above, in which the first bridge structures and the auxiliary electrodes are present on the pixel electrode layer, each first bridge structure is provided at and configured for the connection point between a wiring and a common electrode block corresponding to the wiring, and each auxiliary electrode is connected with a wiring at an intersection between the wiring and a common electrode block insulated from and overlapped with the wiring, so that an electric field generated at a region with the first bridge structure is identical to an electric field generated at a region with the auxiliary electrode, thereby avoiding non-uniform brightness of the display panel, thus the touch display panel also has such beneficial effect.

On the basis of the preceding embodiments, a black matrix is disposed on the color filter substrate, and orthographic projections of a plurality of the wirings of the array substrate onto the array substrate are located within an orthographic projection of the black matrix onto the array substrate. That is, the wirings of the array substrate are shielded by the black matrix, so that the aperture ratio of the touch display panel and light transmittance of a touch display are not affected.

Figure 10:
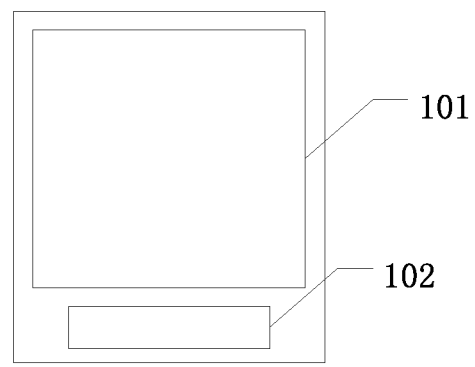
FIG. 10 is a schematic diagram showing a structure of a touch display device, according to embodiments of the disclosure.

Embodiments of the disclosure further provide a touch display device. FIG. 10 is a schematic diagram showing a structure of a touch display device, according to embodiments of the disclosure. As shown in FIG. 10, the touch display device includes: a touch display panel 101 and a drive chip 102 configured to drive the touch display panel 101 in a display phase and a touch sensing phase, where, the touch display panel 101 may be one described in any of the embodiments described above. Since the touch display device utilizes the touch display panel described above, the touch display device also has the beneficial effect of the display panel in the embodiments described above.

It is noted that the touch display device provided by embodiments of the disclosure can further include other circuits and devices for supporting the touch display device to work properly. The touch display device may be any of a cellphone, a tablet computer, electronic paper, an electronic photo frame and so on.

It should be noted that the above description describes embodiments and technical principles of the disclosure. Those skilled in the art will understand that the disclosure is not limited to the specific embodiments described herein, and various apparent changes, rearrangements and substitutions may be made by those skilled in the art without departing from the protecting scope of the disclosure. Therefore, although the disclosure has been described in detail as above in connection with the embodiments, the disclosure is not to limit thereto and may include other equivalent embodiments without departing from the conception of the disclosure Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. An array substrate, comprising:
   a substrate;
   a pixel electrode layer, which is disposed on the substrate and comprises a plurality of pixel electrodes spaced from each other and arranged in an array;
   a common electrode layer, which is disposed at a side of the pixel electrode layer close to the substrate and comprises a plurality of common electrode blocks spaced from each other and arranged in an array, wherein the common electrode blocks are operable as touch electrodes;
   a wiring layer, which is disposed at a layer different from the pixel electrode layer and comprises a plurality of wirings, wherein each of the wirings is electrically connected with a corresponding one of the common electrode blocks but is electrically insulated from other common electrode blocks, and at least one wiring is each overlapped with at least one common electrode block electrically insulated therefrom; and
   first bridge structures and auxiliary electrodes disposed in the pixel electrode layer, wherein each first bridge structure is disposed at and configured for connection between the wiring and the common electrode block corresponding to the wiring, and each auxiliary electrode is connected with one of the wirings and disposed above the common electrode block insulated from and overlapped with the wiring.

2. The array substrate of claim 1, wherein, the first bridge structures, the auxiliary electrodes and the pixel electrodes are made of the same material in the same process.

3. The array substrate of claim 1, wherein the wiring layer is located at a side of the common electrode layer close to the substrate.

4. The array substrate of claim 1, wherein, the wiring layer is located between the common electrode layer and the pixel electrode layer.

5. The array substrate of claim 1, wherein, the wiring layer is disposed at the same layer as the common electrode layer.

6. The array substrate of claim 1, wherein, the wiring is extended along a column of the common electrode blocks, and overlapped with at least a portion of the common electrode blocks in the column of common electrode blocks.

7. The array substrate of claim 6, wherein, the wiring is overlapped with all common electrode blocks in the column of common electrode blocks.

8. The array substrate of claim 6, further comprising a dummy conductive wiring segment, wherein the dummy conductive wiring segment is located at the same line as the wiring and is disposed in a region of the common electrode block insulated from but not overlapped with the wiring.

9. The array substrate of claim 8, wherein, the dummy conductive wiring segment is electrically connected with the common electrode block corresponding to the dummy conductive wiring segment by the first bridge structure.

10. The array substrate of claim 1, further comprising a plurality of data lines and a plurality of scanning lines, wherein the wirings are parallel to either the data lines or the scanning lines.

11. The array substrate of claim 10, wherein an orthographic projection of the wiring onto the array substrate is located within an orthographic projection of either the data line or the scanning line onto the array substrate.

12. The array substrate of claim 1, wherein, a sum of the first bridge structures and the auxiliary electrodes both connected with each common electrode block is identical.

13. A touch display panel, comprising:
   an array substrate;
   a color filter substrate disposed opposite to the array substrate, and
   a liquid crystal layer disposed between the array substrate and the color filter substrate, wherein
   the array substrate comprises:
   a substrate;
   a pixel electrode layer, which is disposed on the substrate and comprises a plurality of pixel electrodes spaced from each other and arranged in an array;
   a common electrode layer, which is disposed at a side of the pixel electrode layer close to the substrate and comprises a plurality of common electrode blocks spaced from each other and arranged in an array, wherein the common electrode blocks are operable as touch electrodes;
   a wiring layer, which is disposed at a layer different from the pixel electrode layer and comprises a plurality of wirings, wherein each of the wirings is electrically connected with a corresponding one of the common electrode blocks but is electrically insulated from other common electrode blocks, and at least one wiring is each overlapped with at least one common electrode block electrically insulated therefrom; and
   first bridge structures and auxiliary electrodes disposed in the pixel electrode layer, wherein each first bridge structure is disposed at and configured for a connection between the wiring and the common electrode block corresponding to the wiring, and each auxiliary electrode is connected with one of the wirings and disposed above the common electrode block insulated from and overlapped with the wiring.

14. The touch display panel of claim 13, wherein, the color filter substrate is provided with a black matrix, and orthographic projections of the plurality of wirings of the array substrate onto the array substrate is located within an orthographic projection of the black matrix onto the array substrate.

15. A touch display device, comprising a touch display panel and a drive chip configured for driving the touch display panel in a display phase and a touch sensing phase, wherein the touch display panel comprises:
an array substrate;
a color filter substrate disposed opposite to the array substrate, and
a liquid crystal layer disposed between the array substrate and the color filter substrate, wherein
the array substrate comprises:
a substrate;
a pixel electrode layer, which is disposed on the substrate and comprises a plurality of pixel electrodes spaced from each other and arranged in an array;
a common electrode layer, which is disposed at a side of the pixel electrode layer close to the substrate and comprises a plurality of common electrode blocks spaced from each other and arranged in an array, wherein the common electrode blocks are operable as touch electrodes;
a wiring layer, which is disposed at a layer different from the pixel electrode layer and comprises a plurality of wirings, wherein each of the wirings is electrically connected with a corresponding one of the common electrode blocks but is electrically insulated from other common electrode blocks, and at least one wiring is each overlapped with at least one common electrode block electrically insulated therefrom; and
first bridge structures and auxiliary electrodes disposed in the pixel electrode layer, wherein each first bridge structure is disposed at and configured for a connection between the wiring and the common electrode block corresponding to the wiring, and each auxiliary electrode is connected with one of the wirings and disposed above the common electrode block insulated from and overlapped with the wiring.

* * * * *